United States Patent [19]
Palmero

[11] Patent Number: 5,126,605
[45] Date of Patent: Jun. 30, 1992

[54] OSCILLATING STEPPER MOTOR
[75] Inventor: Albert Palmero, Middlefield, Conn.
[73] Assignee: Tri-Tech, Inc., Waterbury, Conn.
[21] Appl. No.: 691,376
[22] Filed: Apr. 25, 1991
[51] Int. Cl.[5] .................................. H02K 33/00
[52] U.S. Cl. .................. 310/36; 310/49 R; 310/40 MM; 310/116
[58] Field of Search ............. 310/36, 49 R, 40 MM, 310/116, 254, 261

[56] References Cited
U.S. PATENT DOCUMENTS

| | | | |
|---|---|---|---|
| 3,475,629 | 3/1967 | Lagier | 310/36 |
| 3,644,763 | 2/1972 | Skrobisch | 310/36 |
| 4,274,026 | 6/1981 | Haydon et al. | 310/254 |
| 4,404,484 | 9/1983 | Gillott | 310/49 R |
| 4,533,847 | 8/1985 | Idogaki et al. | 310/181 |
| 4,595,849 | 6/1986 | Cuénoud | 310/36 |
| 4,795,929 | 1/1989 | Elgass et al. | 310/36 |
| 4,803,389 | 2/1989 | Ogawa et al. | 310/49 R |
| 4,816,707 | 3/1989 | Vanderlaan | 310/36 |
| 4,959,568 | 9/1990 | Stokes | 310/36 |
| 4,973,866 | 2/1989 | Wang | 310/49 R |
| 4,990,806 | 2/1991 | Kikuchi et al. | 310/49 R |

FOREIGN PATENT DOCUMENTS
58-78772 5/1983 Japan .................. 310/49 R

Primary Examiner—Steven L. Stephan
Assistant Examiner—Matthew Nguyen
Attorney, Agent, or Firm—John H. Crozier

[57] ABSTRACT

In a preferred embodiment, an oscillating stepping motor having only one stator phase. What would otherwise be a second stator phase is a magnet fixedly disposed with respect to the rotor to produce a detent position of the rotor. When the stator is energized, the field of the fixed magnet is at least partially overcome and the rotor steps to a first predetermined position. When the stator is de-energized, the rotor returns to the detent position. Alternately energizing and de-energizing the stator causes the rotor to oscillate between the two positions. Alternatively, an angle of oscillation twice that produced above may be provided by reversing the stator field to oscillate the rotor between the first predetermined position and a second predetermined position produced by reversing the stator field.

15 Claims, 4 Drawing Sheets

OSCILLATING STEPPER MOTOR

BACKGROUND OF THE INVENTION

1. Field of the Invention

The present invention relates generally to stepping motors and, more particularly, to a simple stepping motor for providing oscillating motion.

2. Background Art

Stepping motors are well known devices for producing incremental motion in which electrical pulses are translated into mechanical movements by causing an output shaft to move a specific incremental distance or "step" for each pulse applied to the motor. As opposed to a conventional motor which has a free-running shaft, the stepping motor shaft moves in fixed, repeatable known increments, resulting in the ability to accurately position. These motors are controlled by drive circuitry which provides the necessary number, sequence, and rate of pulses to achieve the desired extent of movement.

Conventional stepping motors have at least two stator phases. To take a step, the current is alternately changed (reversed), first in one phase, then in the other. Each change causes the rotor of the motor to rotate one step which may be 15 degrees 7.5 degrees 2 degrees or whatever step angle the motor has been designed to produce. In many applications, a very large number of pulses may be produced to cause the rotor to rotate a selected number of rotations in one direction.

Some applications, such as some bar code readers, require a stepping motor to take only one step clockwise and then one step counter-clockwise, thus producing an oscillating back-and-forth motion. In the case of bar code readers, the oscillating motion sweeps a laser beam across the bar code so that the bar code can be "read" by means of decoding the pattern of reflected light.

A disadvantage of conventional stepping motors used in oscillating modes is that they are relatively more complicated than need be to produce the simple oscillating motion.

Accordingly, it is a principal object of the present invention to provide an oscillating stepping motor that is simple, has relatively few parts, and is economical to construct.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, an oscillating stepping motor having only one stator phase. What would otherwise be a second stator phase is a magnet fixedly disposed with respect to the rotor to produce a detent position of the rotor. When the stator is energized, the field of the fixed magnet is at least partially overcome and the rotor steps to a first predetermined position. When the stator is de-energized, the rotor returns to the detent position. Alternately energizing and de-energizing the stator causes the rotor to oscillate between the two positions. Alternatively, an angle of oscillation twice that produced above may be provided by reversing the stator field to oscillate the rotor between the first predetermined position and a second predetermined position produced by reversing the stator field.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, in which.

DETAILED DESCRIPTION OF THE PREFERRED EMBODIMENTS

Figure 1:
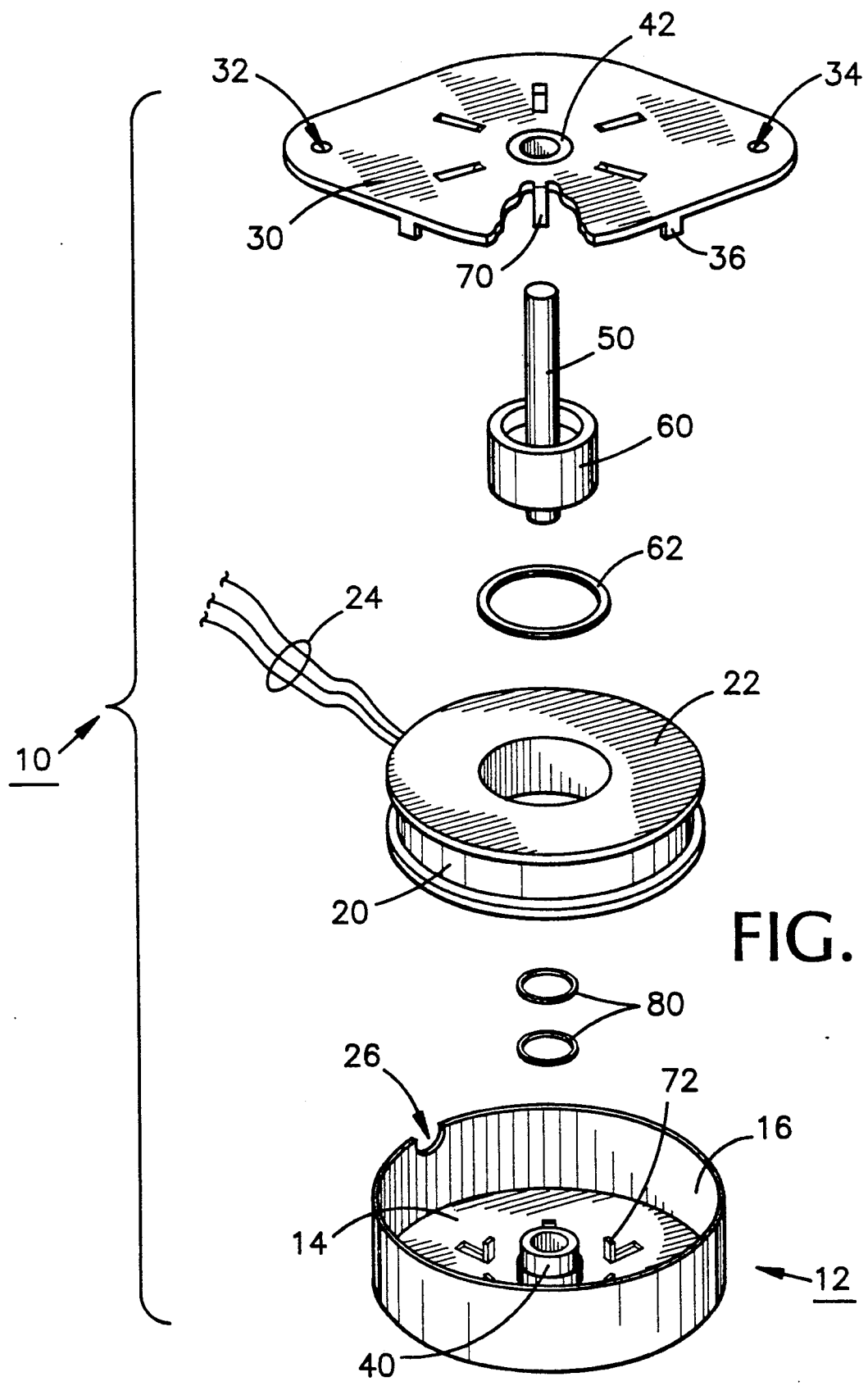
FIG. 1/is an exploded perspective view, partially cut-away, of an oscillating stepping motor constructed according to the present invention.
Figure 2:
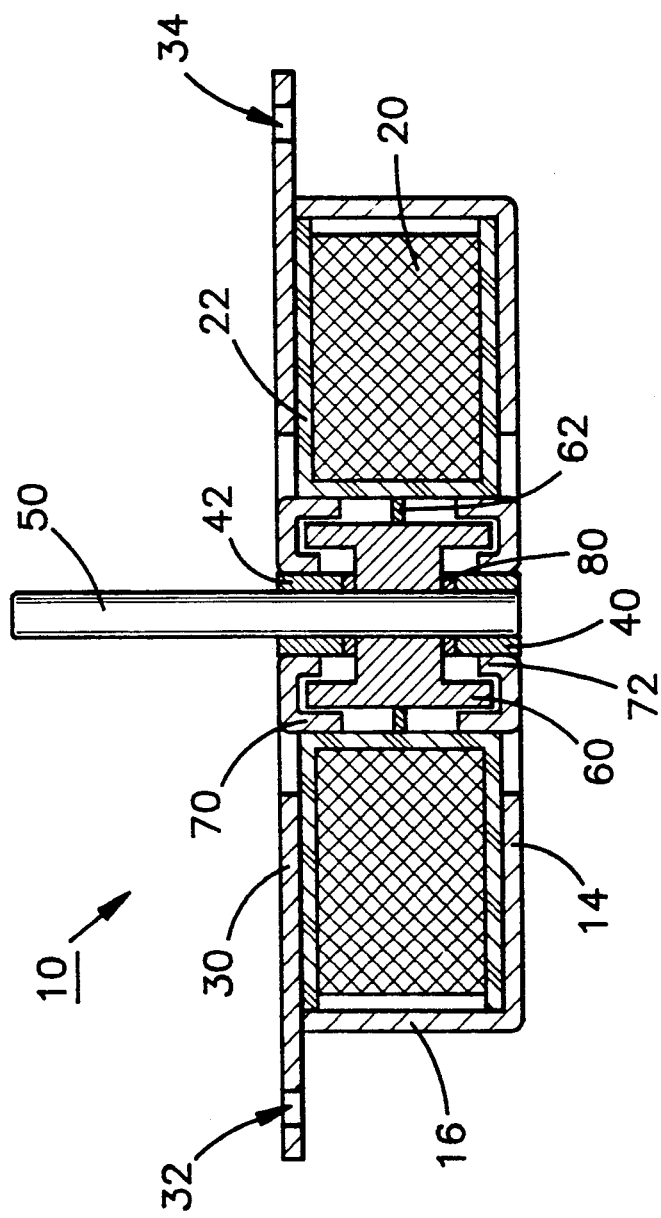
FIG. 2 is a side elevational view, in cross-section, of the motor of FIG. 1.

Referring now to the Drawing, in which similar or identical elements are given consistent identifying numerals throughout the various figures thereof, initial reference should be made to FIGS. 1 and 2 whereon there is depicted an oscillating stepping motor constructed according to the present invention, generally indicated by the reference numeral 10.

Motor 10 includes a magnetically conductive easing, generally indicated by the reference numeral 12, which, in turn, includes a base plate portion 14 and a cylindrical shell portion 16 formed integrally with the base plate portion. Disposed within casing 12 is an electrically conductive, annular stator coil 20 wound upon a plastic bobbin 22. Electric current to stator coil 20 is supplied through leads 24 which pass from the stator coil to external control circuitry (not shown) through an opening 26 defined in the upper portion of shell 16.

A magnetically conductive cover plate 30 is disposed at the top of shell 16 and has defined therein apertures 32 and 34 through which fasteners (not shown) may be inserted to mount motor 10. Extending orthogonally downwardly from the edge of cover plate 30 are a plurality of tabs, as at 36, which are employed to center the cover plate on shell 16. Cover 30 may be joined to shell 16 by means of an adhesive or by other conventional means.

Journalled in bearings 40 and 42 fixedly disposed centrally of base plate 14 and cover plate 30, respectively, for axially aligned rotation centrally of stator coil 20 is a shaft 50 the distal end of which may be attached to whatever is desired to be driven by motor 10.

Fixedly disposed on shaft 50 is a generally cylindrical, axially magnetized rotor magnet 60 which extends generally between base plate 14 and cover plate 30 along the thickness of stator coil 20. An axially magnetized annular magnet 62 is fixedly attached to the inner surface of bobbin 22 at approximately the axial midpoint of rotor magnet 50.

Six upper pole pieces, as at 70, are formed by slitting cover plate 30 and bending the resulting tabs orthogonally upward to form the upper pole pieces. Likewise six lower pole pieces, as at 72 are formed by slitting base plate 14 and bending the resulting tabs orthogonally upward to form the lower pole pieces. The respective sets of pole pieces 70 and 72 are evenly disposed in a circular pattern about the upper and lower portions of rotor magnet 60.

Completing the elements of motor 10 are spacer washers 80 which may be provided to compensate for manufacturing tolerances.

Figure 3:
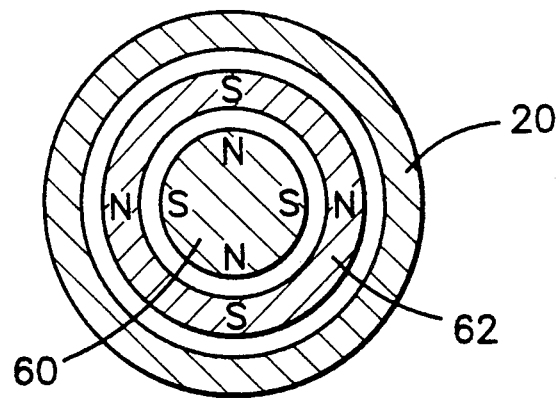
FIG. 3 is a schematic top plan view showing the relationship of rotor, stator coil, and magnet according to one embodiment of the present invention.
Figure 4:
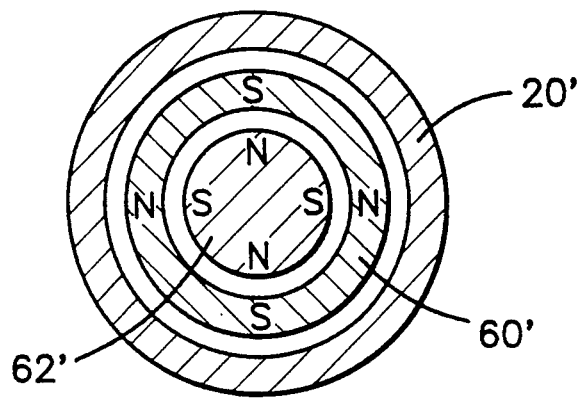
FIG. 4 is a schematic top plan view showing the relationship of rotor, stator coil, and magnet according to another embodiment of the present invention.
Figure 5:
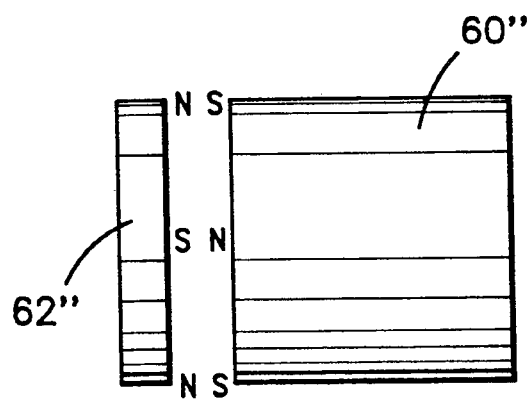
FIG. 5 is a schematic side elevational view of the motor of FIG. 1 showing an alternative location for the magnet.

FIG. 3 illustrates schematically the arrangement of stator coil 20, rotor magnet 60, and fixed magnet 62 as shown on FIGS. 1 and 2. Other arrangements of those elements are within the intent of the present invention and FIG. 4 illustrates schematically an alternative arrangement in which a fixed cylindrical magnet 62' is disposed centrally of a rotor magnet 60'. While FIG. 1 and 2 show fixed magnet 62 disposed at the axial midpoint of rotor magnet 60, FIG. 5 illustrates schematically that a fixed magnet 62" may be disposed adjacent one end (or the other) of a rotor magnet 60".

Figure 6A:
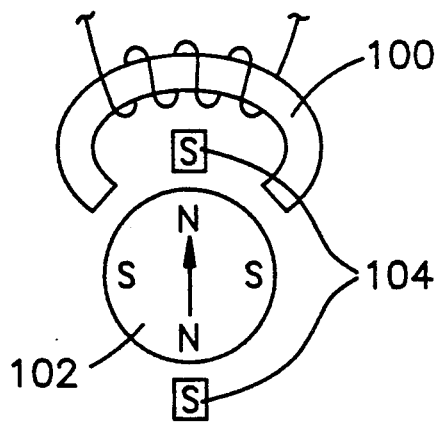
FIGS. 6A, 6B, and 6C illustrate the principal of operation of the motor of the present invention.
Figure 6B:
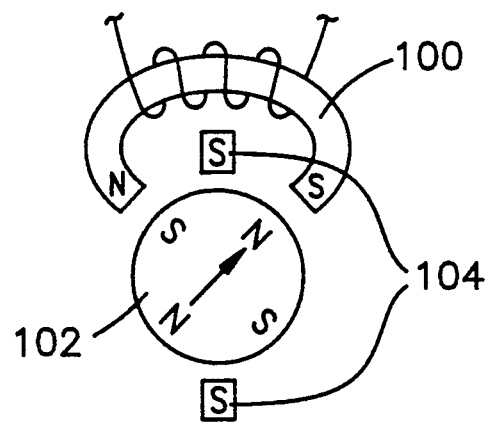
Figure 6C:
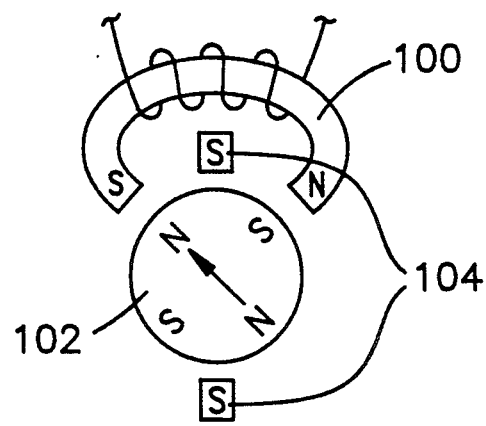

Reference now to FIGS. 6A-6C will aid in understanding the principal of operation of the oscillating stepping motor of the present invention. There is schematically illustrated a stator structure 100, a permanent magnet rotor structure 102, and a fixed permanent magnet 104 which may be assumed to correspond, respectively, to elements 20, 60, and 62 on FIGS. 1-3.

FIG. 6A illustrates the position of rotor 102 when stator 100 is unenergized, leading the rotor in its detent position in which its N poles are aligned with the S poles of magnet 104. When stator 100 is energized as shown on FIG. 6B, rotor 102 will rotate or "step" up to approximately 45 degrees clockwise to the position shown on that figure. When stator 100 is energized as shown on FIG. 6C, rotor 102 will rotate or "step" up to approximately 45 degrees counterclockwise to the position shown of that figure. The actual angle to which rotor 102 rotates depends on the strength of the magnetic field developed in stator 100 compared to the strength of magnet 104 and, by selectively varying the strength of the magnetic field developed in the stator, the angle of rotation or "stepping" can be selected—up to 45 degrees in this case.

Thus, it will be understood that there are three modes in which rotor 102 can produce oscillating stepping motion. First, stator 100 may be alternatingly energized and de-energized, respectively, to rotate rotor 102 clockwise to the position shown on FIG. 6B and to return the rotor to the detent position shown on FIG. 6A. Second, stator 100 may be alternatingly energized and de-energized, respectively, to rotate rotor 102 counterclockwise to the position shown on FIG. 6C and to return the rotor to the detent position shown on FIG. 6A. Third, stator 100 may be energized to alternatingly rotate rotor 102 between the positions shown on FIGS. 6B and 6C, so that the angle of oscillation could approach 90 degrees with the magnetic arrangement shown.

Compared with a conventional two-phase motor, it can be seen that the fixed magnet acts as the equivalent of one phase that is energized continuously. Therefore, more power has to be applied to the "other" phase to overcome the strength of the magnet. However, the motor of the present invention is very economical to construct. This not only reduces cost but also enables one to make the motor more "pancake" in design, a strong added advantage for applications such as bar code reading.

Figure 7:
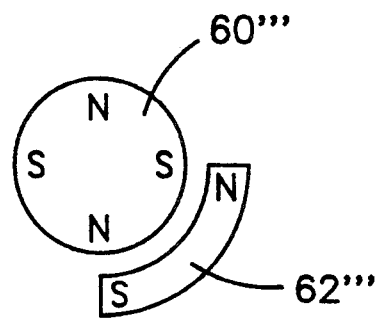
FIG. 7 is a schematic top plan view of an alternative embodiment of the present invention.

In one embodiment of motor 10 shown on FIGS. 1 and 2, rotor magnet 60 and fixed magnet 62 are each provided with six N/S pole pairs and the angle of oscillation produced is in the range of up to 15 degrees each side of the detent position. Having equal numbers of pole pairs will often be the preferred arrangement; however, such is not required by the present invention and the number of pole pairs on the fixed magnet may be lesser or greater than the number of pole pairs on the rotor magnet. It will also be understood that the fixed magnet need not be cylindrical or annular, but it may be arcuate with only two poles or even have the configuration indicated on FIGS. 6A-C. On FIG. 7, there is illustrated an arcuate magnet 62''' disposed circumjacent a cylindrical rotor magnet 60'''. The objective is to obtain sufficient magnetic coupling to create sufficient detent torque. The relative numbers of poles on the rotor and the fixed magnet, the relative strengths thereof, the configuration of the fixed magnet, and the relative strength of the stator field for a particular application can be determined easily by techniques well known to those skilled in the art. However, it will be understood that the chosen oscillating angle to one side of the detent position must always be less than 180 degrees.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic any specific features of the invention herein described and all statements of the scope of the invention which, as a matter of language might be said to fall therebetween.

I claim:

1. An oscillating stepping motor, comprising:
    (a) a single-phase annular stator coil defining a central cylindrical cavity, said annular stator coil producing a magnetic field of a first polarity when energized by an electric current passed therethrough in a first direction;
    (b) a cylindrical rotor, including a rotor magnet, disposed for a rotating movement centrally of said annular stator coil within said central cylindrical cavity and coaxially with said annular stator coil said cylindrical rotor being responsive to said magnetic field of a first polarity produced in said annular stator coil to rotate less than 180 degrees from a detent position to a first position determined by said magnetic field of said first polarity; and
    (c) a detent magnet fixedly disposed with respect to said stator coil within said cylindrical cavity to cause said rotor to rotate to said detent position whenever said annular stator coil is de-energized.

2. An oscillating stepping motor, as defined in claim 1, wherein said rotor magnet comprises a cylindrical shell and said detent magnet is disposed within said cylindrical shell.

3. An oscillating stepping motor, as defined in claim 1, wherein said detent magnet is disposed externally of said rotor magnet.

4. An oscillating stepping motor, as defined in claim 3, wherein said detent magnet is annular and is disposed circumjacent said rotor magnet in a plane orthogonal to an axis of said rotor.

5. In oscillating stepping motor, as defined in claim 4, wherein said plane is at approximately an axial midpoint of said rotor.

6. An oscillating stepping motor, as defined in claim 3, wherein said detent magnet is arcuate and is disposed circumjacent said rotor magnet in a plane orthogonal to an axis of said rotor.

7. An oscillating stepping motor, as defined in claim 1, wherein said rotor magnet and said detent magnet are axially magnetized.

8. An oscillating stepping motor, as defined in claim 1, further comprising:
 (a) a housing in which said annular stator coil and said rotor are disposed, said housing including a base plate and a cover plate disposed at either end of said annular stator coil and extending over said central cavity; and
 (b) a plurality of pole pieces integral with, and extending orthogonally from, each of said base plate and said cover plate into said central cavity circumjacent said rotor magnet, each of said pole pieces comprising a tab cut from, and bent away from the plane of, its respective plate.

9. An oscillating stepping motor, as defined in claim 1, wherein said cylindrical rotor is responsive to a magnetic field of a second polarity, produced in said annular stator coil energized by an electric current passed therethrough in a second direction, to rotate less than 180 degrees to a second position determined by said magnetic field of said second polarity.

10. An oscillating stepping motor, comprising:
 (a) a single-phase annular stator coil defining a central cylindrical cavity, said annular stator coil producing a magnetic field of a first polarity when energized by an electric current passed therethrough in a first direction;
 (b) a cylindrical rotor, including a rotor magnet disposed entirely within said central cylindrical cavity, said cylindrical rotor being disposed for a rotating movement centrally of said annular stator coil, said cylindrical rotor being responsive to said magnetic field of a first polarity produced in said annular stator coil to rotate less than 180 degrees from a detent position to a first position determined by said magnetic field of said first polarity; and
 (c) a detent magnet fixedly disposed with respect to said stator coil to cause said rotor to rotate to said detent position whenever said annular stator coil is de-energized.

11. An oscillating stepping motor, as defined in claim 10, wherein said rotor magnet comprises a cylindrical shell and said detent magnet is disposed within said cylindrical shell.

12. An oscillating stepping motor, as defined in claim 10, wherein said detent magnet is disposed adjacent one end of said rotor magnet.

13. An oscillating stepping motor, as defined in claim 10, wherein said rotor magnet and said detent magnet are axially magnetized.

14. An oscillating stepping motor, as defined in claim 10, further comprising:
 (a) a housing in which said annular stator coil and said rotor are disposed, said housing including a base plate and a cover plate disposed at either end of said annular stator coil and extending over said central cavity; and
 (b) a plurality of pole pieces integral with, and extending orthogonally from, each of said base plate and said cover plate into said central cavity circumjacent said rotor magnet, each of said pole pieces comprising a tab cut from, and bent away from the plane of, its respective plate.

15. An oscillating stepping motor, as defined in claim 10, wherein said cylindrical rotor is responsive to a magnetic field of a second polarity, produced in said annular stator coil energized by an electric current passed therethrough in a second direction, to rotate less than 180 degrees to a second position determined by said magnetic field of said second polarity.

* * * * *